(12) United States Patent
Meleis et al.

(10) Patent No.: US 7,907,527 B2
(45) Date of Patent: Mar. 15, 2011

(54) METHODS, SYSTEMS, AND COMPUTER PROGRAM PRODUCTS FOR GROOMING TRAFFIC ON A SHARED NETWORK FACILITY BASED ON A PEAK UTILIZATION ANALYSIS OF THE SHARED NETWORK FACILITY

(75) Inventors: Hanafy Meleis, Weston, FL (US); Sameh Yamany, Plano, TX (US); Mohamed Battisha, Plantation, FL (US); Ayman Eldeib, Sunrise, FL (US)

(73) Assignee: NetTraffic, Inc., Frisco, TX (US)

( * ) Notice: Subject to any disclaimer, the term of this patent is extended or adjusted under 35 U.S.C. 154(b) by 343 days.

(21) Appl. No.: 11/842,244

(22) Filed: Aug. 21, 2007

(65) Prior Publication Data

US 2008/0101229 A1  May 1, 2008

Related U.S. Application Data

(60) Provisional application No. 60/862,911, filed on Oct. 25, 2006.

(51) Int. Cl.
*H04J 1/16* (2006.01)
(52) U.S. Cl. .......... 370/233; 370/235; 709/226
(58) Field of Classification Search ............ 370/233
See application file for complete search history.

(56) References Cited

U.S. PATENT DOCUMENTS

| 5,673,253 | A  | * | 9/1997  | Shaffer ................... 370/229 |
| 5,867,483 | A  | * | 2/1999  | Ennis et al. ............... 370/252 |
| 2004/0143663 | A1 | * | 7/2004  | Leedom et al. ............ 709/226 |
| 2004/0228278 | A1 | * | 11/2004 | Bruckman et al. .......... 370/231 |
| 2005/0174961 | A1 |   | 8/2005  | Hrastar |
| 2006/0056352 | A1 |   | 3/2006  | Proctor et al. |

FOREIGN PATENT DOCUMENTS

EP          0 939 521 A2      9/1999

OTHER PUBLICATIONS

Notification of Transmittal of the International Search Report and The Written Opinion of the International Searching Authority for PCT/US2007/022011 dated Jul. 11, 2008.

* cited by examiner

*Primary Examiner* — Huy D Vu
*Assistant Examiner* — Maria Sekul
(74) *Attorney, Agent, or Firm* — Myers Bigel Sibley & Sajovec, P.A.

(57) ABSTRACT

A communication network is operated by monitoring a bandwidth utilization of a shared network resource, performing a statistical analysis to determine a mean utilization peak and/or a utilization peak coefficient of variance, monitoring a bandwidth utilization of lines, ports, and/or channels associated with the shared network resource, performing a statistical analysis to determine a percentage M of the lines, ports, and/or channels whose consumption of bandwidth exceeds a first threshold percentage of the mean utilization peak, and determining whether to groom traffic carried by the shared network resource based on the mean utilization peak, the utilization peak coefficient of variance, and/or the percentage M.

21 Claims, 4 Drawing Sheets

METHODS, SYSTEMS, AND COMPUTER PROGRAM PRODUCTS FOR GROOMING TRAFFIC ON A SHARED NETWORK FACILITY BASED ON A PEAK UTILIZATION ANALYSIS OF THE SHARED NETWORK FACILITY

RELATED APPLICATION

This application claims the benefit of and priority to U.S. Provisional Patent Application No. 60/862,911, filed Oct. 25, 2006, the disclosure of which is hereby incorporated herein by reference as if set forth in its entirety.

FIELD OF THE INVENTION

The present invention relates to communication networks and methods of operating the same, and, more particularly, to methods, system, and computer program products for grooming traffic on a shared network facility.

BACKGROUND OF THE INVENTION

Time-to-market pressure, stringent Service Level Agreement (SLA) requirements, slim product margins, and reduced capital equipment budgets may combine to make it difficult for network service providers to provision their networks so as to efficiently process traffic thereon. Because adding resources to increase bandwidth can be expensive, service providers often use existing records, crude line length calculations, and/or manual spot testing techniques to identify problematic lines/ports/channels for the purpose of generating a network-grooming proposal. Network service providers often search for cost-effective solutions that can allow them to automate the process of bandwidth utilization "avoidance" or bandwidth "shifting" to smooth out bandwidth demand and consumption. Even if the cost of bandwidth continues to fall, it may not always be desirable to buy more bandwidth in response to network congestion. Moreover, unexpected spikes in bandwidth usage may indicate an internal or external security threat, such as a Denial of Service (DOS) attack. As a result, simply adding resources in response to peak bandwidth usage may merely be covering up an underlying network problem.

SUMMARY

According to some embodiments of the present invention, a communication network is operated by monitoring a bandwidth utilization of a shared network resource, performing a statistical analysis to determine a mean utilization peak and/or a utilization peak coefficient of variance, monitoring a bandwidth utilization of lines, ports, and/or channels associated with the shared network resource, performing a statistical analysis to determine a percentage M of the lines, ports, and/or channels whose consumption of bandwidth exceeds a first threshold percentage of the mean utilization peak, and determining whether to groom traffic carried by the shared network resource based on the mean utilization peak, the utilization peak coefficient of variance, and/or the percentage M.

In other embodiments, monitoring the bandwidth utilization of the shared network resource comprises monitoring the bandwidth utilization of the shared network resource over a time period periodically at a defined frequency.

In still other embodiments, the time period is greater than one day and the frequency is about once every 15 minutes.

In still other embodiments, monitoring the bandwidth utilization of the lines, ports, and/or channels comprises monitoring the bandwidth utilization of the lines, ports, and/or channels if the mean utilization peak exceeds a second threshold percentage.

In still other embodiments, the first threshold percentage is about 50% and the second threshold percentage is about 75%.

In still other embodiments, the method further comprises categorizing the shared network resource into one of the following categories: category A if P is greater than about 75% of Um and Cp is greater than about 15%; category B if P is greater than about 75% of Um and Cp is less than about 15%; category C if P is less than about 75% of Um and M is less than about 25%; category D if P is less than about 75% of Um and M is greater than about 25%, but less than about 50%; category E if P is less than about 75% of Um and M is greater than about 50%, but less than about 70%; and category F if P is less than about 75% of Um and M is greater than about 70%; wherein Um is a maximum possible bandwidth utilization of the shared network resource, P is the mean utilization peak, and Cp is the utilization peak coefficient of variance.

In still other embodiments, determining whether to groom the traffic carried by the shared network resource comprises determining whether to groom traffic based on a number of shared resources in the communication network that have been categorized in categories A, B, and/or C.

In still other embodiments, the method further comprises grooming the traffic carried by the shared network resource if the number of shared resources in category A is greater than zero or if the sum of the numbers of shared resources in categories B and C is greater than about 35% and less than about 50% of all the shared resources in the communication network.

In still other embodiments, grooming the traffic comprises re-provisioning at least one of the lines, ports, and/or channels associated with the shared network resource.

In still other embodiments, re-provisioning at least one of the lines, ports, and/or channels associated with the shared network resource comprises selecting the at least one of the lines, ports, and/or channels that has a lower than average bandwidth utilization and has a lower than average peak bandwidth utilization.

Although described primarily above with respect to method embodiments of the present invention, it will be understood that the present invention may be embodied as methods, systems, and/or computer program products.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EXEMPLARY EMBODIMENTS

Figure 1:
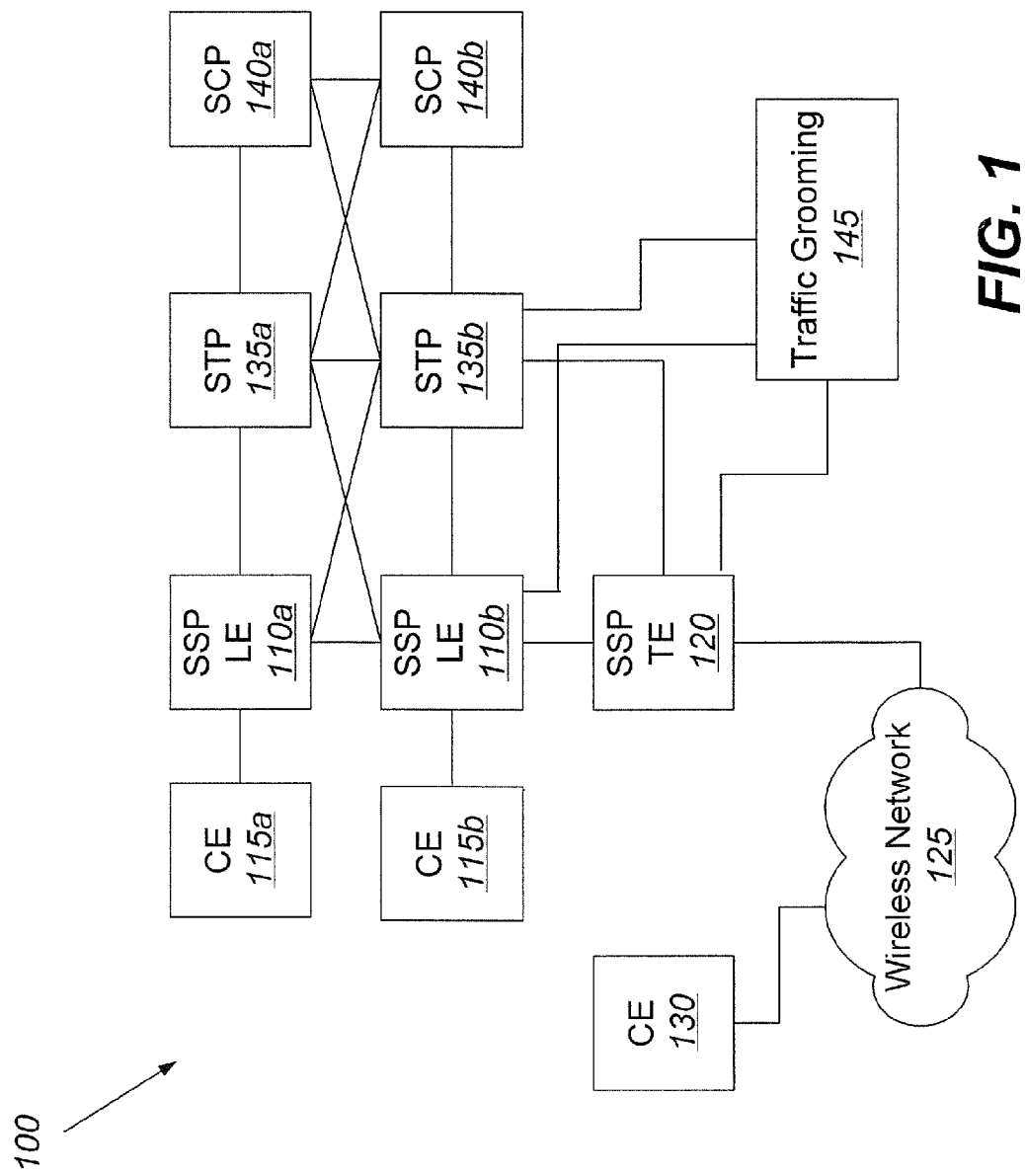
FIG. 1 illustrates a communication network that illustrates methods, systems, and computer program products for grooming traffic on a shared network facility based on a peak utilization analysis of the shared network facility in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

For purposes of illustration, some embodiments of the present invention are described herein with respect to a communication network that uses Signaling System 7 (SS7) for call setup and termination. It will be understood, however, that embodiments of the present invention are not limited to SS7 networks or any particular Common Channel Signaling (CCS) network, but instead may be embodied generally as any network architecture capable of carrying out the operations described herein. In addition, some embodiments of the present invention are illustrated in the context of a circuit switched communication network, such as the public switched telephone network (PSTN). It will be understood, however, that embodiments of the present invention are not limited to any particular type of communication network, but can be embodied in various types of communication networks including, but not limited to, circuit switched networks and packet switched networks, such as Voice Over Internet Protocol (VoIP) networks.

Referring now to FIG. 1, an exemplary network architecture 100, in accordance with some embodiments of the present invention, comprises Service Switching Points (SSPs) 110a and 110b that terminate customer equipment (CE) 115a and 115b, respectively. It will be understood that CE 115a and 115b may represent one or more devices that may be used to originate and or terminate a call over a communication network, such as the public switched telephone network (PSTN). The SS7 network 100 further comprises an SSP 120 that is connected to another network, such as a wireless network 125, by, for example, trunk lines/channels. The wireless network terminates CE 130, which may represent one or more mobile terminals. As used herein, the term "mobile terminal or device" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

SSPs 110a and 110b are switches that originate, terminate, and route calls and provide entry into the SS7 network. SSPs 110a and 110b may be called "local exchange" switches because they terminate connections to end-users and, as shown in FIG. 1, optionally include trunk connection(s) between each other. SSP 120 may be called a "tandem exchange" because it does not terminate connections to end users, but instead terminates only trunks to other SSPs (e.g., SSP 110b) or the wireless network 125, for example. SSPs 110a and 110b may be referred to as Class 5 switching systems while SSP 120 may be referred to as a Class 4 switching system.

In an SS7 network, SSPs send signaling messages to other SSPs to setup, manage, and release network resources to complete calls/connections. The signaling traffic between SSPs is carried by one or more Signal Transfer Points (STPs). As shown in FIG. 1, STPs 135a and 135b may be used to SS7 signaling messages between SSPs 110a and 110b and/or to other SSPs not shown in FIG. 1. An STP is typically embodied as a packet switch that routes each incoming message to an outgoing signaling link based on routing information contained in the SS7 message.

The SS7 network 100 further comprises Signal Control Points (SCPs) 140*a* and 140*b*, which may optionally be used to provide Intelligent Network (IN) services by allowing the SSPs in the SS7 network to access the SCPs via special signaling messages.

The trunks between SSPs 110*a* and 110*b* and/or between 110*b* and 120 may be subject to congestion, which may result in service quality degradation. In accordance with some embodiments of the present invention, a traffic grooming function 145 may be configured to identify peak bandwidth usage for specific trunks or trunk groups in the network 100 to identify the lines, ports, and or channels that contribute to over utilization of various ones of the trunks. Once the usage patterns are determined, specific lines, ports, and/or channels may be reassigned to various trunks to provide smoother network performance and fewer bandwidth peaks. This may allow a service provider to postpone purchasing additional benefit in response to traffic demands until a later date.

In accordance with various embodiments of the present invention, the traffic grooming function 145 may be implemented as a single server, separate servers, or a network of servers either co-located in a server farm, for example, or located in different geographic locations. Moreover, the traffic grooming function may be implemented as part of one or more of the SSPs or as part of the SS7 infrastructure, i.e., one or more of the STPs. The various elements of the communication network 100 may be connected by a global network, such as the Internet or other publicly accessible network. Various elements of the network may be interconnected by a wide area network, a local area network, an Intranet, and/or other private network, which may not accessible by the general public. Thus, the communication network 100 may represent a combination of public and private networks or a virtual private network. Although FIG. 1 illustrates an exemplary communication network, it will be understood that the present invention is not limited to such configurations, but is intended to encompass any configuration capable of carrying out the operations described herein.

Figure 2:
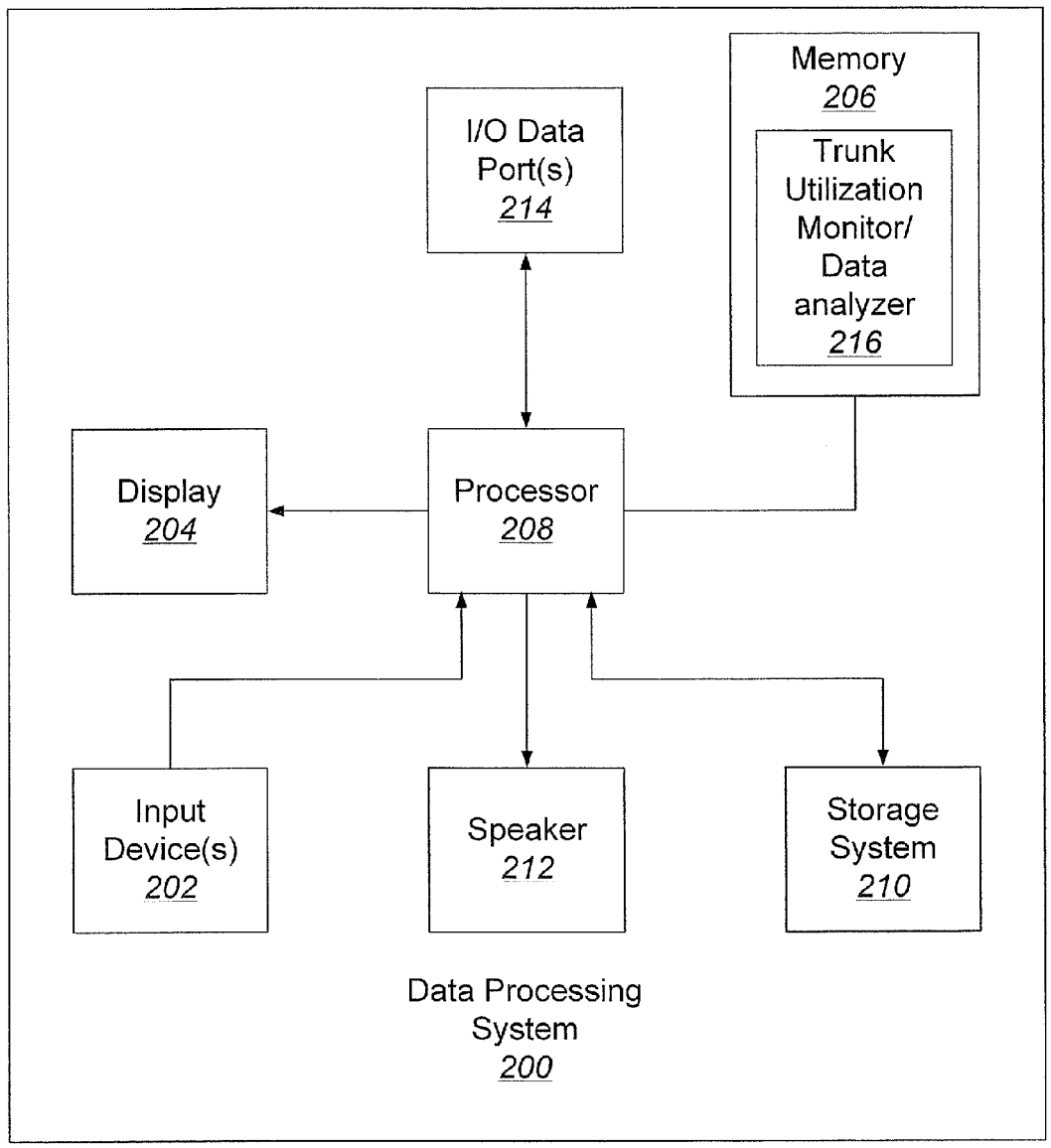
FIG. 2 is a block diagram of a data processing system that can be used to implement the traffic grooming function of FIG. 1 in accordance with some embodiments of the present invention.

Referring now to FIG. 2, a data processing system 200 that may be used to implement the traffic grooming function of FIG. 1, in accordance with some embodiments of the present invention, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a trunk utilization monitor/data analyzer 216 that can be used to collect trunk utilization data for various shared facilities in a communication network, analyze the shared facility utilization data to determine the utilization of the lines, ports, and/or channels that contribute to the utilization of the shared facility, and generate a grooming proposal to improve the overall utilization of trunks or shared facilities in the communication network.

Figure 3:
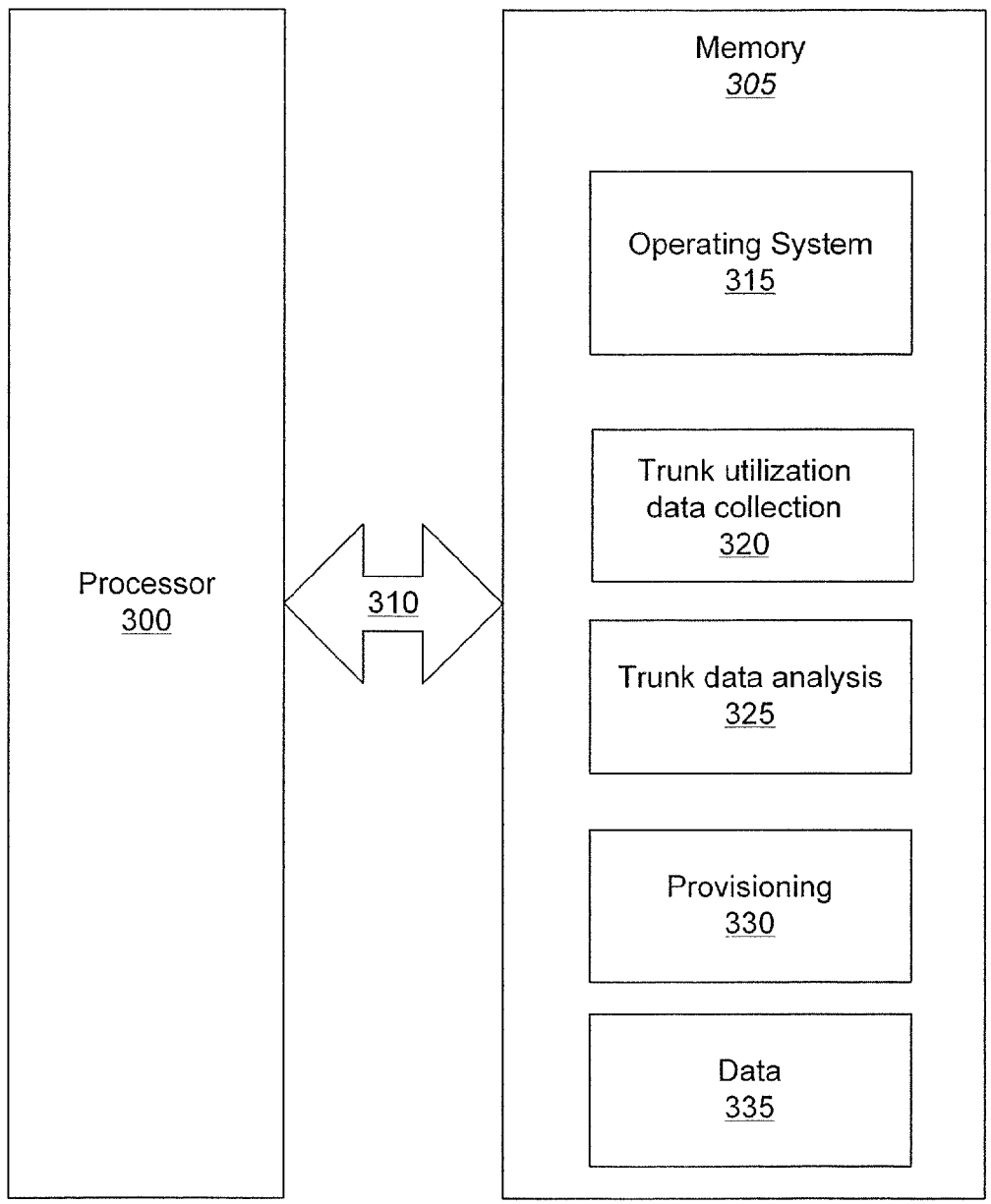
FIG. 3 is a block diagram of a hardware/software architecture for the traffic grooming function of FIG. 1 in accordance with some embodiments of the present invention.

FIG. 3 illustrates a processor 300 and memory 305 that may be used in embodiments of the traffic grooming function 145 of FIG. 1 and data processing system 200 of FIG. 2 in accordance with some embodiments of the present invention. The processor 300 communicates with the memory 305 via an address/data bus 310. The processor 300 may be, for example, a commercially available or custom microprocessor. The memory 305 is representative of the one or more memory devices containing the software and data used for monitoring DSL lines through a DSLAM and analyzing the collected data, in accordance with some embodiments of the present invention. The memory 305 may include, but is not limited to, the following types of devices: cache, ROM, PROM, EPROM, EEPROM, flash, SRAM, and DRAM.

As shown in FIG. 3, the memory 305 may contain up to five or more categories of software and/or data: an operating system 315, a trunk utilization and data collection module 320, a trunk data analysis module 325, a provisioning module 330, and a data module 335. The operating system 315 generally controls the operation of the traffic grooming function 145. In particular, the operating system 315 may manage the traffic grooming function's software and/or hardware resources and may coordinate execution of programs by the processor 300. The trunk utilization and data collection module 320 may be configured to monitor the utilization of various trunks and/or shared facilities in a communication network and store the data in the data module 335. The trunk data analysis module 325 may be configured to perform a statistical analysis on the trunk/shared facility utilization data collected by the trunk utilization and data collection module 320. The provisioning module 330 may be configured to generate a traffic-grooming proposal for the trunks and/or shared facilities in the network to improve the overall utilization of the trunks and/or shared facilities.

Although FIG. 3 illustrates exemplary hardware/software architectures that may be used in the traffic grooming function of FIG. 1, it will be understood that the present invention is not limited to such a configuration but is intended to encompass any configuration capable of carrying out operations described herein. Moreover, the functionality of the data processing system 200 of FIG. 2 and the hardware/software architectures of FIG. 3 may be implemented as a single processor system, a multi-processor system, or even a network of stand-alone computer systems, in accordance with various embodiments of the present invention.

Computer program code for carrying out operations of data processing systems discussed above with respect to FIG. 2 and/or the software modules discussed above with respect to FIG. 3 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Exemplary operations for identifying peak bandwidth usage for specific resources, such as trunks, trunk groups, and/or shared facilities in a communication network and identifying the lines, ports, and or channels that contribute to over utilization of various ones of the resources, in accordance with some embodiments of the present invention, will now be described. Operations begin at block 400 where the trunk utilization and data collection module 320 monitors the utilization of various trunks in the communication network periodically, such as, for example, every 15 minutes. At block 405, the trunk data analysis module 325 detects the utilization peak P of each monitored trunk during each hour. The operations of blocks 400 and 405 may be repeated for several days, e.g., $N_d$ days, to collect enough data for a statistical analysis.

At block 410 the trunk data analysis module 425 calculates the mean and the coefficient of variance of each peak during each hour of a day. The coefficient of variance is used to normalize the variance value because it measures the spread of a set of data as a proportion of its mean. The mean utilization peak and the utilization peak variance are given below as Equations 1 and 2:

$$\overline{P} = \frac{\sum_{i=1}^{N_d} P_j}{N_d} \qquad \text{EQ. 1}$$

$$S_P^1 = \frac{1}{(N_d - 1)} \sum_{i=1}^{N_d} (Pi - \overline{P})^1 \qquad \text{EQ. 2}$$

Equation 2, however, is a theoretical formula of the variance. The computational formula for the utilization peak variance is given by Equation 3 below:

$$S_P^2 = \frac{\sum_{i=1}^{N_d} P_i^2 - \frac{\left(\sum_{i=1}^{N_d} P_i\right)^2}{N_d}}{N_d - 1} \qquad \text{EQ. 3}$$

The utilization peak coefficient of variance is given by Equation 4 below:

$$C_P = \frac{S_P^2}{\overline{P}} \qquad \text{EQ. 4}$$

At block 415, the trunk utilization and data collection module 320 monitors the utilization of all lines, ports, and/or channels associated with each trunk and/or shared facility at each peak hour if the mean utilization peak value for the trunk and/or shared facility exceeds a threshold, such as 75%.

The trunk utilization and data collection module 320 sorts the lines, ports, and/or channels based on their utilization level and then calculates the percentage M of the contributors that consume at least 50% of its mean utilization peak. Thus, M is given by Equation 5 below:

$$M = \frac{D}{N} * 100 \qquad \text{EQ. 5}$$

where D is the number of lines, ports, and/or channels running on each trunk and/or shared facility and consume at least 50% of its mean utilization peak and N is the total number of lines, ports, and/or channels running on each trunk and/or shared facility.

Based on the percentage M and the peak coefficient of variance and the mean utilization peak, the trunk data analysis module 325 classifies each trunk and/or facility into one of a plurality of categories at block 420 based on various thresholds that can be defined by a service provider. In the example shown below, six categories A through F are defined as follows:

$\overline{P} >= 75\%$ of $U_\infty$ & $C_P >= 15\% \longrightarrow A$ $\overline{P} >= 75\%$ of $U_\infty$ & $C_P < 15\% \longrightarrow B$ $\overline{P} < 75\%$ of $U_\infty$ & $M < 25\% \longrightarrow C$ $\overline{P} < 75\%$ of $U_\infty$ & $(50\% > M >= 25\%) \longrightarrow D$ $\overline{P} < 75\%$ of $U_\infty$ & $(70\% > M >= 50\%) \longrightarrow E$ $\overline{P} < 75\%$ of $U_\infty$ & $M >= 70\% \longrightarrow F$ Where $U_m$ is the maximum possible utilization of each backbone trunk.

The trunk data analysis module may, at block 425, determine whether to groom the traffic carried by the trunks, trunk groups, and/or shared facilities based on thresholds applied to the categories defined at block 420. In some embodiments, if the number of trunks classified in group A is more than zero or the sum of trunks classified in groups B and C is more than 35% and less than 50% of all of the trunks in the network, then a grooming proposal will be generated. If, however, the sum of trunks in groups A, B, and C is more than 50% of the total of all provisioned trunks in the network, then it is generally desirable to add new bandwidth.

At block 430, the provisioning module 330 may generate a grooming proposal based on the analysis performed at block 425. In some embodiments, the grooming proposal may include re-provisioning the worst lines, ports, and channels contributing to the utilization of the highest utilized trunk or facility to the lowest utilized trunk or facility. The lines, ports, and/or channels may be selected based on two criteria in accordance with some embodiments of the present invention: 1) they should be among those lines, ports, and/or channels having among the lowest utilizations; and 2) they should not be among those lines, ports, and/or channels having among the highest utilizations at other times of day. A goal may be to bring each over utilized trunk or facility to about 50% or less of its maximum possible utilization. The number of lines, ports, and/or channels $N_p$ that need re-provisioning may be calculated based on Equation 6 below:

$$U_p = P - 0.5 * U_w \quad \text{EQ. 6}$$

Where $N_p$ is the number of lines, ports, and/or channels running on each trunk and/or facility and consume $N_p$ of its maximum possible utilization, where Equation 7 holds below:

$$\overline{P} < 0.5 * U_w | \quad \text{EQ. 7}$$

This may reduce the number of lines, ports, and/or channels that are re-provisioned while still smoothing network bandwidth demand and consumption.

Figure 4:
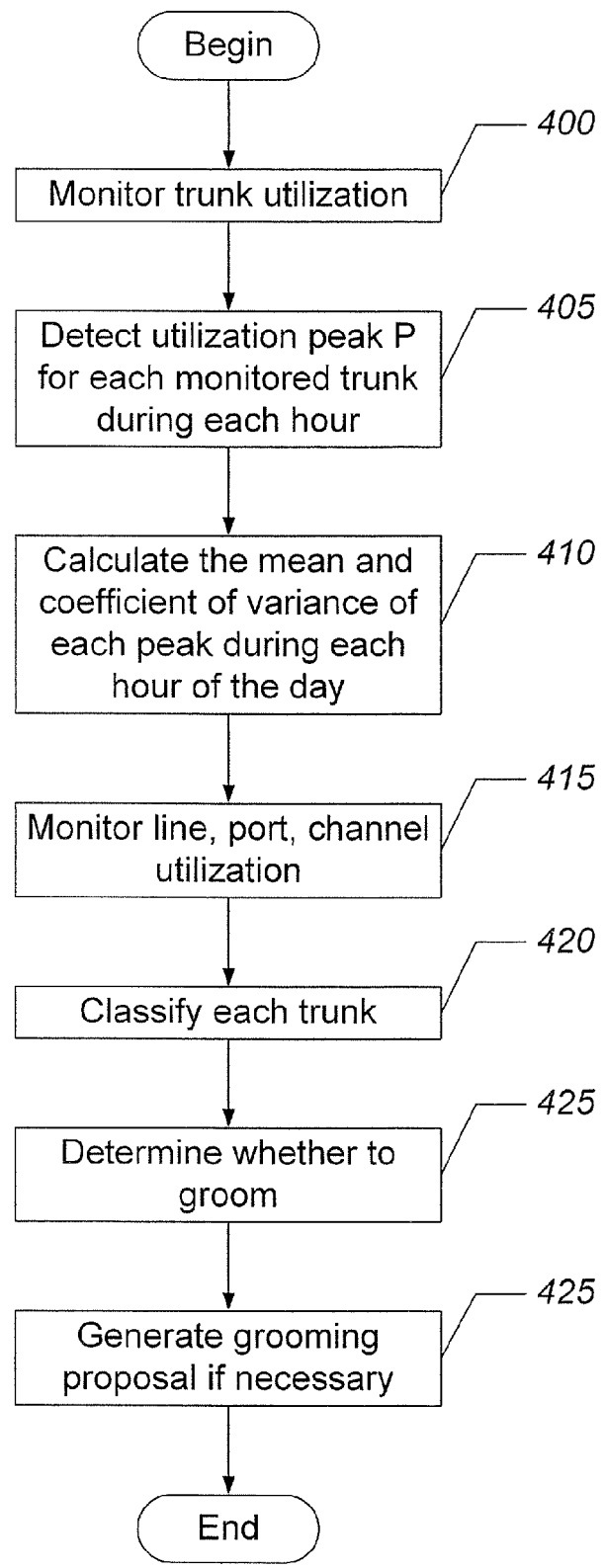
FIG. 4 is a flowchart that illustrates operations grooming traffic on a shared network facility based on a peak utilization analysis of the shared network facility in accordance with some embodiments of the present invention.

The operations of FIG. 4 can be repeated if the lines, ports, and/or channels have not been re-provisioned should conditions change and it is desired to obtain an alternative grooming proposal. Otherwise, once the lines, ports, and/or channels have been re-provisioned, the operations of FIG. 4 can resume so as to possibly generate a new grooming proposal should traffic conditions in the network change over time.

Thus, some embodiments of the present invention may provide an automated system and method to determine whether network grooming or adding new bandwidth is desired in response to changing bandwidth demands in the network. Network traffic introduced by monitoring operations may also be reduced as traffic monitoring may be limited to peak utilization times for each trunk and/or shared facility. Moreover, the number of grooming orders and lines, ports, and/or channels may be reduced while still smoothing out bandwidth demand and consumption.

Many variations and modifications can be made to the embodiments described herein without substantially departing from the principles of the present invention. All such variations and modifications are intended to be included herein within the scope of the present invention, as set forth in the following claims.

That which is claimed:

1. A method of operating a communication network, comprising:
    monitoring a bandwidth utilization of a shared network resource;
    performing a statistical analysis to determine at least one of a mean utilization peak and a utilization peak coefficient of variance;
    monitoring at least one of a bandwidth utilization of lines, ports, and channels associated with the shared network resource;
    performing a statistical analysis to determine at least one of a percentage (M) of the lines, ports, and channels whose consumption of bandwidth exceeds a first threshold percentage of the mean utilization peak; and
    determining whether to groom traffic carried by the shared network resource based on the percentage (M).

2. The method of claim 1, wherein monitoring the bandwidth utilization of the shared network resource comprises monitoring the bandwidth utilization of the shared network resource over a time period periodically at a defined frequency.

3. The method of claim 2, wherein the time period is greater than one day and the frequency is about once every 15 minutes.

4. The method of claim 1, wherein monitoring the bandwidth utilization of at least one of the lines, ports, and channels comprises monitoring the bandwidth utilization of at least one of the lines, ports, and channels if the mean utilization peak exceeds a second threshold percentage.

5. The method of claim 4, wherein the first threshold percentage is about 50% and the second threshold percentage is about 75%.

6. The method of claim 1, further comprising:
    categorizing the shared network resource into one of the following categories:
        category A if P is greater than about 75% of Um and Cp is greater than about 15%;
        category B if P is greater than about 75% of Um and Cp is less than about 15%;
        category C if P is less than about 75% of Um and M is less than about 25%;
        category D if P is less than about 75% of Um and M is greater than about 25%, but less than about 50%;
        category E if P is less than about 75% of Um and M is greater than about 50%, but less than about 70%; and
        category F if P is less than about 75% of Um and M is greater than about 70%;
    wherein Um is a maximum possible bandwidth utilization of the shared network resource, P is the mean utilization peak, and Cp is the utilization peak coefficient of variance.

7. The method of claim 6, wherein determining whether to groom the traffic carried by the shared network resource comprises determining whether to groom traffic based on a number of shared resources in the communication network that have been categorized in at least one of categories A, B, and C.

8. The method of claim 7, further comprising:
    grooming the traffic carried by the shared network resource if the number of shared resources in category A is greater than zero or if the sum of the numbers of shared resources in categories B and C is greater than about 35% and less than about 50% of all the shared resources in the communication network.

9. The method of claim 8, wherein grooming the traffic comprises re-provisioning at least one of the lines, ports, and channels associated with the shared network resource.

10. The method of claim 9, wherein re-provisioning at least one of the lines, ports, and channels associated with the shared network resource comprises selecting the at least one of the lines, ports, and channels that has a lower than average bandwidth utilization and has a lower than average peak bandwidth utilization.

11. A computer program product comprising a computer readable medium having computer readable program code embodied therein, the computer readable program code being configured to implement the method of claim 1.

12. A traffic management system for a communication network, comprising:
    a traffic grooming system that is configured to monitor a bandwidth utilization of a shared network resource, perform a statistical analysis to determine at least one of a mean utilization peak and a utilization peak coefficient of variance, monitor at least one of a bandwidth utilization of lines, ports, and channels associated with the shared network resource, perform a statistical analysis to determine at least one of a percentage (M) of the lines, ports, and channels whose consumption of bandwidth exceeds a first threshold percentage of the mean utilization peak, and determine whether to groom traffic carried by the shared network resource based on the percentage (M).

13. The system of claim 12, wherein the traffic grooming system is further configured to monitor the bandwidth utilization of the shared network resource over a time period periodically at a defined frequency.

14. The system of claim 13, wherein the time is period greater than one day and the frequency is about once every 15 minutes.

15. The system of claim 12, wherein the traffic grooming system is further configured to monitor the bandwidth utilization of at least one of the lines, ports, and channels if the mean utilization peak exceeds a second threshold percentage.

16. The system of claim 15, wherein the first threshold percentage is about 50% and the second threshold percentage is about 75%.

17. The system of claim 12, wherein the traffic grooming system is further configured to categorize the shared network resource into one of the following categories:
   category A if P is greater than about 75% of Um and Cp is greater than about 15%;
   category B if P is greater than about 75% of Um and Cp is less than about 15%;
   category C if P is less than about 75% of Um and M is less than about 25%;
   category D if P is less than about 75% of Um and M is greater than about 25%, but less than about 50%;
   category E if P is less than about 75% of Um and M is greater than about 50%, but less than about 70%; and
   category F if P is less than about 75% of Um and M is greater than about 70%;
   wherein Um is a maximum possible bandwidth utilization of the shared network resource, P is the mean utilization peak, and Cp is the utilization peak coefficient of variance.

18. The system of claim 17, wherein the traffic grooming system is further configured to determine whether to groom the traffic carried by the shared network resource based on a number of shared resources in the communication network that have been categorized in at least one of categories A, B, and C.

19. The system of claim 18, wherein the traffic grooming system is further configured to groom the traffic carried by the shared network resource if the number of shared resources in category A is greater than zero or if the sum of the numbers of shared resources in categories B and C is greater than about 35% and less than about 50% of all the shared resources in the communication network.

20. The system of claim 19, wherein the traffic grooming system is further configured to groom the traffic by re-provisioning at least one of the lines, ports, and channels associated with the shared network resource.

21. The system of claim 20, wherein the traffic grooming system is further configured to re-provision at least one of the lines, ports, and channels associated with the shared network resource by selecting the at least one of the lines, ports, and channels that has a lower than average bandwidth utilization and has a lower than average peak bandwidth utilization.

* * * * *

UNITED STATES PATENT AND TRADEMARK OFFICE
CERTIFICATE OF CORRECTION

| | |
|---|---|
| PATENT NO. | : 7,907,527 B2 |
| APPLICATION NO. | : 11/842244 |
| DATED | : March 15, 2011 |
| INVENTOR(S) | : Meleis et al. |

It is certified that error appears in the above-identified patent and that said Letters Patent is hereby corrected as shown below:

In the Patent:
Column 7, EQ. 2, Lines 61-64:   Please correct $$S_p^{'1} = \frac{1}{(N_d - 1)} \sum_{i=1}^{N_d} (Pi - \overline{P})^1$$

to read $$S_p^2 = \frac{1}{(N_d - 1)} \sum_{i=1}^{N_d} (Pi - \overline{P})^2$$

Column 8, Lines 46-54:   Please correct "$U_\infty$" to read -- $U_m$ --

Column 9, EQ. 6, Line 20:   Please correct "$U_w$" to read -- $U_m$ --
          EQ. 7, Line 26:   Please correct "$U_w$" to read -- $U_m$ --

Signed and Sealed this

Twentieth Day of September, 2011

David J. Kappos
*Director of the United States Patent and Trademark Office*